(12) United States Patent
Nutt et al.

(10) Patent No.: US 7,187,620 B2
(45) Date of Patent: Mar. 6, 2007

(54) METHOD AND APPARATUS FOR BOREHOLE SENSING

(75) Inventors: Les Nutt, Yokohama (JP); Tsutomu Yamate, Yokohama (JP); Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 573 days.

(21) Appl. No.: 10/104,320

(22) Filed: Mar. 22, 2002

(65) Prior Publication Data

US 2003/0179651 A1      Sep. 25, 2003

(51) Int. Cl.
*G01V 1/52* (2006.01)
*G01V 1/40* (2006.01)
*G01V 1/46* (2006.01)
*G01V 1/48* (2006.01)
*G01V 1/50* (2006.01)

(52) U.S. Cl. .................. 367/25; 367/188; 166/66
(58) Field of Classification Search .............. 367/25, 367/188, 911; 166/66, 377
See application file for complete search history.

(56) References Cited

U.S. PATENT DOCUMENTS

| | | | |
|---|---|---|---|
| 3,373,817 A * | 3/1968 | Cubberly, Jr. et al. ..... | 166/66.4 |
| 4,701,891 A * | 10/1987 | Castagna et al. ............. | 367/31 |
| 4,953,136 A * | 8/1990 | Kamata et al. ................ | 367/25 |
| 5,044,460 A | 9/1991 | Kamata et al. | |
| 5,597,042 A | 1/1997 | Tubel et al. | |
| 5,662,165 A | 9/1997 | Tubel et al. | |
| 5,667,023 A * | 9/1997 | Harrell et al. ................ | 175/45 |
| 5,730,219 A | 3/1998 | Tubel et al. | |
| 5,857,710 A * | 1/1999 | Leising et al. ................. | 283/3 |
| 5,947,198 A * | 9/1999 | McKee et al. ............. | 166/66.4 |

(Continued)

FOREIGN PATENT DOCUMENTS

| | | |
|---|---|---|
| EP | 0409361 A2 | 1/1991 |
| WO | WO 01/77488 | 10/2001 |

OTHER PUBLICATIONS

M.R. Islam, SPE, Dalhousie University, Faculty of Engineering, "Emerging Technologies in Subsurface Monitoring of Petroleum Reservoirs", SPE 69440.

(Continued)

*Primary Examiner*—Jack Keith
*Assistant Examiner*—Scott A. Hughes
(74) *Attorney, Agent, or Firm*—Karan Singh; William Batzer; Dale Gaudier

(57) ABSTRACT

The present invention provides an apparatus and method for sensing subsurface data. One embodiment of the invention comprises a shuttle attached to a conveyance where the conveyance and shuttle are adapted to be spooled downhole into a borehole for sensing seismic data. The shuttle contains a sensor package that is preferably acoustically isolated in the shuttle. The sensor package includes a sensor array and a magnet clamp. A sensor section can contain several shuttles, each shuttle containing at least one sensor. In one embodiment, the sensor can be a fiber optic sensor. The magnet clamp is operable to controllably clamp and acoustically couple together the sensor package, the shuttle, and the adjacent structure which is typically the borehole casing. The magnet clamp is likewise operable to unclamp and uncouple the shuttle from the adjacent structure so as to be retracted uphole for subsequent use.

14 Claims, 7 Drawing Sheets

U.S. PATENT DOCUMENTS

| | | | |
|---|---|---|---|
| 6,006,832 A | 12/1999 | Tubel et al. | |
| 6,019,173 A * | 2/2000 | Saurer et al. | 166/98 |
| 6,065,538 A | 5/2000 | Reimers et al. | |
| 6,131,658 A * | 10/2000 | Minear | 166/250.01 |
| 6,160,762 A * | 12/2000 | Luscombe et al. | 367/149 |
| 6,161,433 A | 12/2000 | Erath | |
| 6,192,983 B1 * | 2/2001 | Neuroth et al. | 166/250.15 |
| 6,253,848 B1 | 7/2001 | Reimers et al. | |
| 6,268,911 B1 | 7/2001 | Tubel et al. | |
| 6,269,198 B1 | 7/2001 | Hodgson et al. | |
| 6,269,883 B1 * | 8/2001 | Gissler et al. | 166/340 |
| 6,357,539 B1 * | 3/2002 | Ruttley | 175/328 |
| 6,374,913 B1 | 4/2002 | Robbins et al. | |
| 6,526,818 B1 * | 3/2003 | Head et al. | 73/152.01 |
| 6,577,244 B1 * | 6/2003 | Clark et al. | 340/854.6 |
| 6,614,718 B2 * | 9/2003 | Cecconi et al. | 367/86 |
| 2002/0000320 A1 | 1/2002 | Gissler | |
| 2003/0081501 A1 | 5/2003 | Nightingale et al. | |
| 2003/0117895 A1 * | 6/2003 | Brandsaeter | 367/81 |

OTHER PUBLICATIONS

J. Algeroy, SPE, and R. Pollock, SPE, Schlumberger, "Equipment and Operation of Advanced Completions in the M-15 Wytch Farm Multilateral Wall", SPE 62951.

READ News, Dec. 2001, Read Group, Inc. marketing brouchure. Imaging the Invisible—Q-Borehole—, pp. 18-31, Marketing CD, 2000.

S. T. Vohra, B. Danver, A.B. Tveten and A. Dandridge, "High Performance Fiber Optic Accelerometers", Proceedings of OFS-11, U.S. Navel Research Laboratory, pp. 654-657, 1996.

K. Dobashi, H. Arai, R. Sato and Y. Kohama, "A study on the allowable number of fiber-optic sensors with time-division multiplexing", pp. 522-525, UDT, 1995.

Litton catalog, "Fiber Optic Borehole System Hydrophone Array". Good vibrations, Well Evaluation, pp. 19-33, 1988.

* cited by examiner

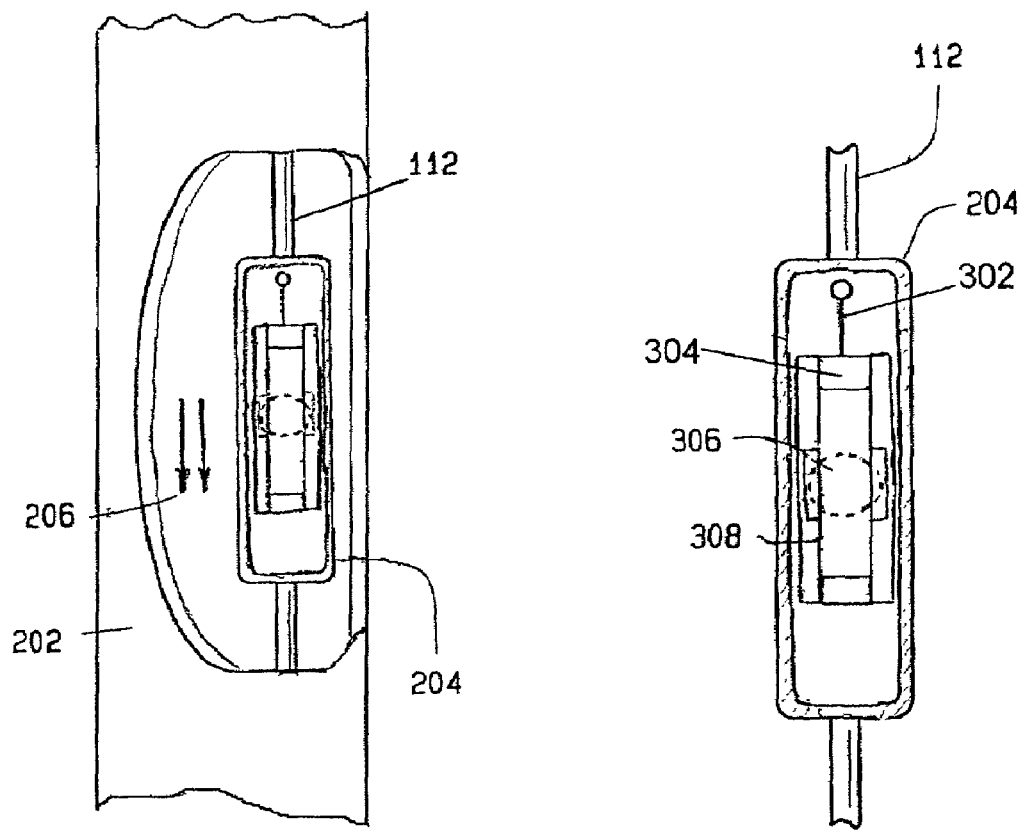
FIG. 2
FIG. 3
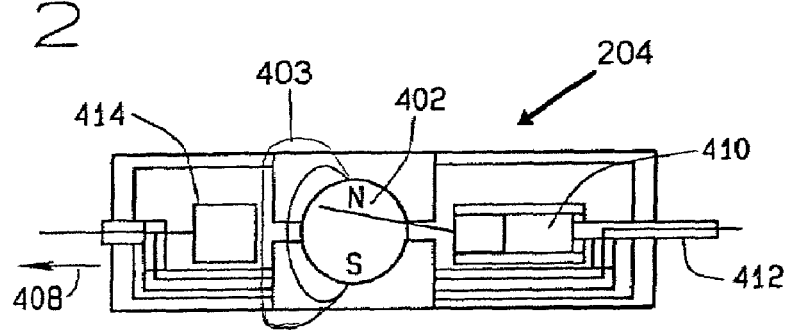
FIG. 4A
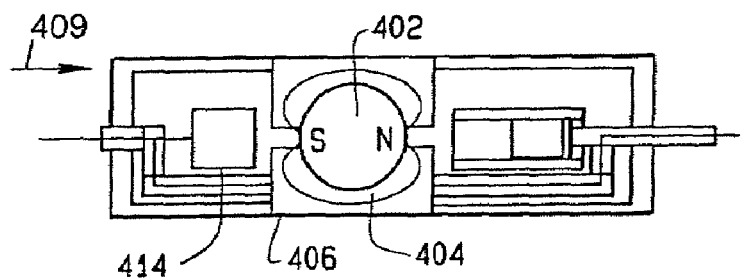
FIG. 4B

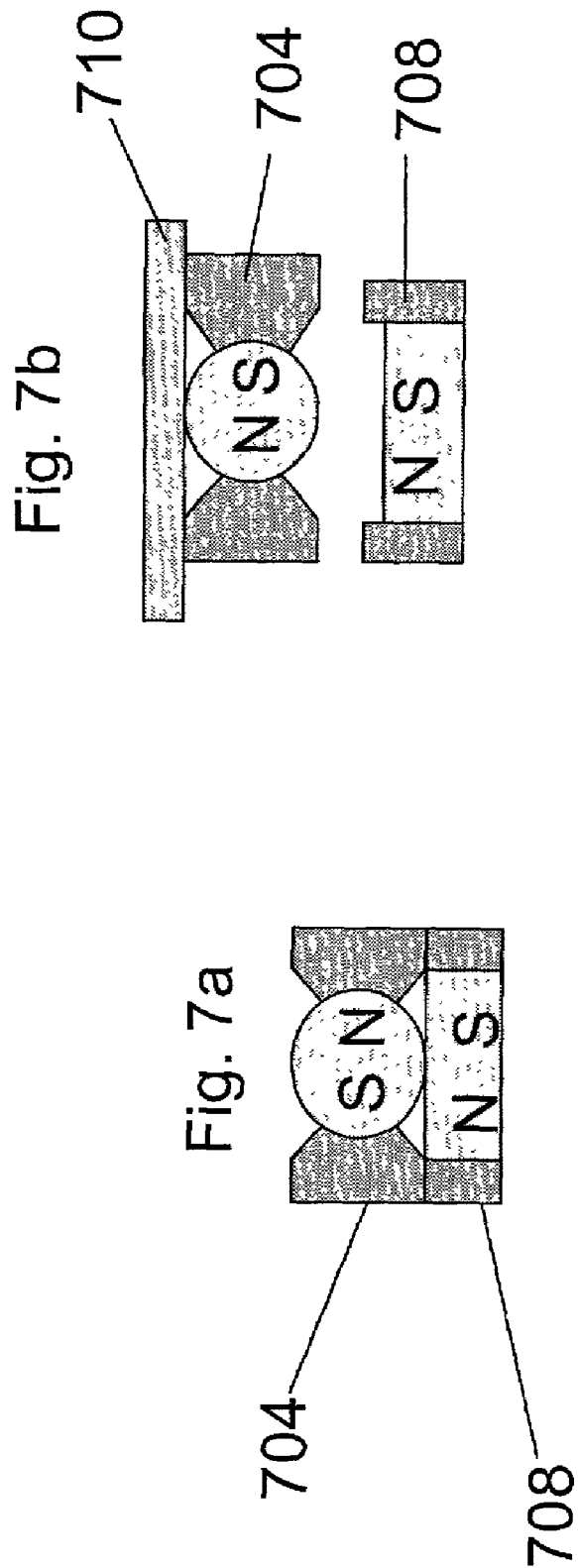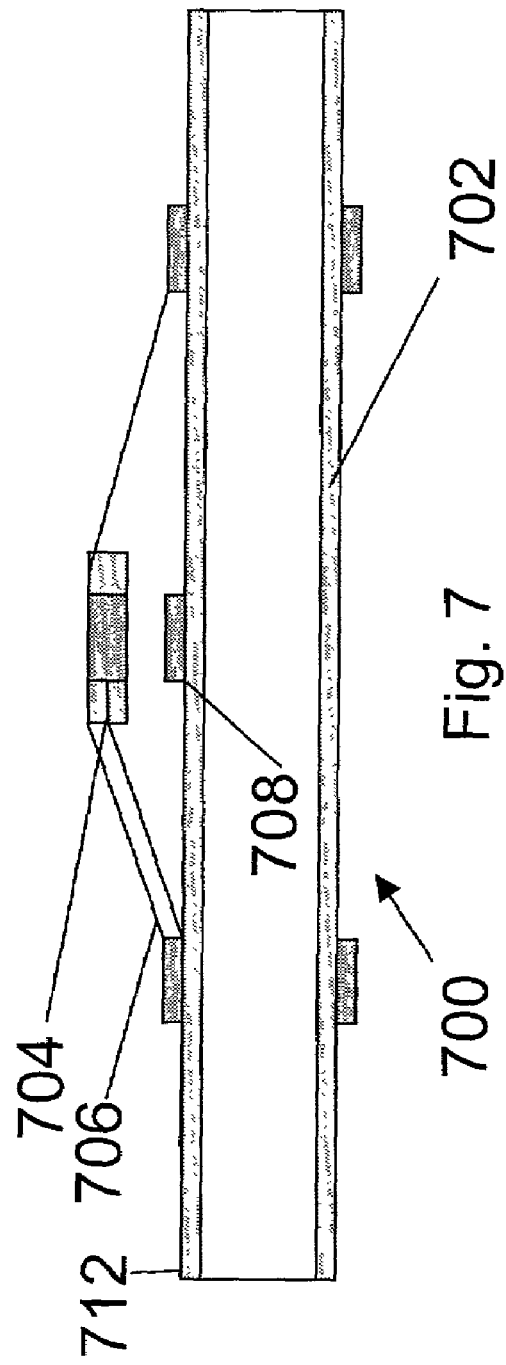

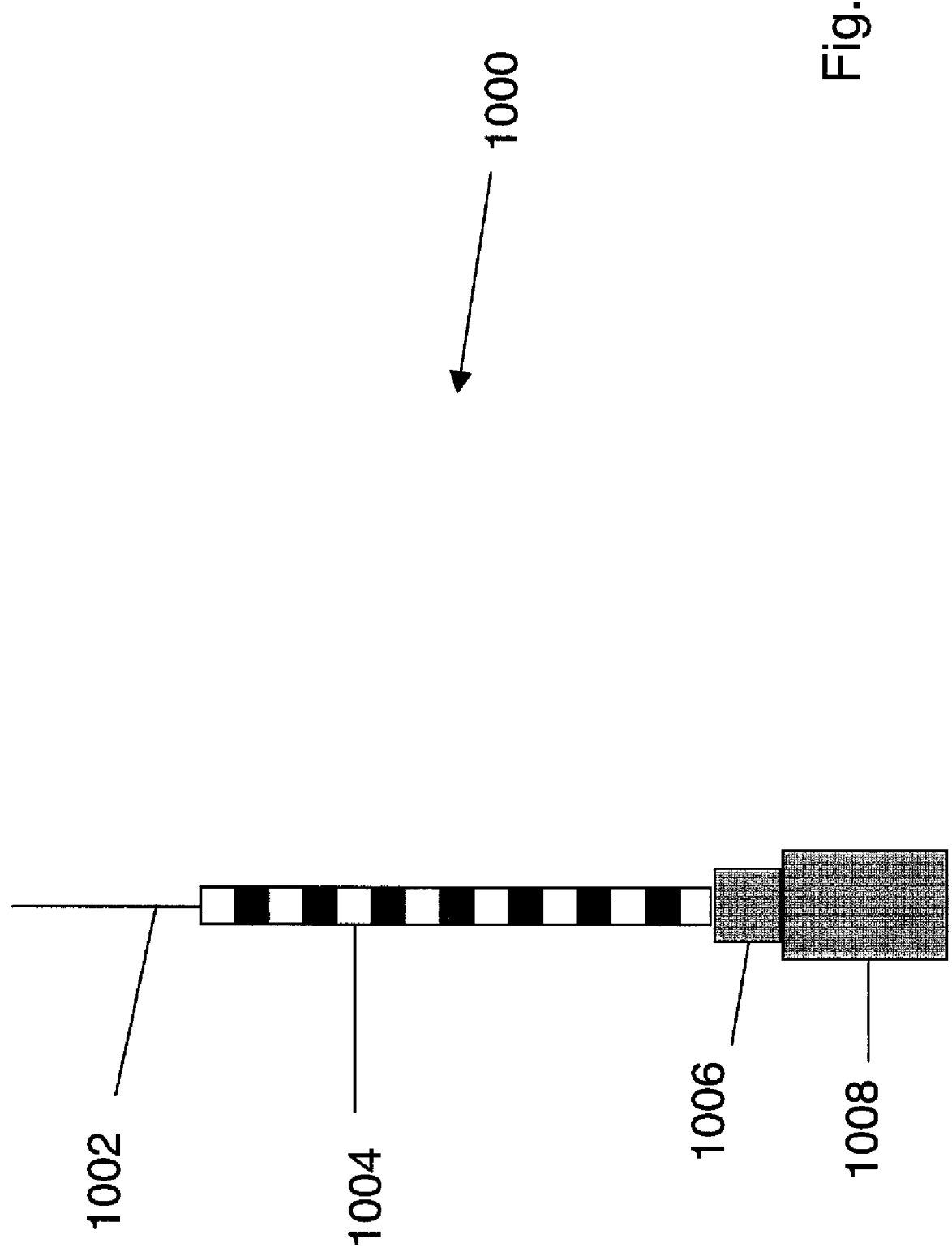

METHOD AND APPARATUS FOR BOREHOLE SENSING

BACKGROUND OF INVENTION (1) Field of Invention

This invention is related to development of acoustic sensors configurations and methods for efficiently recording subsurface seismic data and more particularly to utilization of acoustic sensors for recording borehole seismic data.

(2) Background Art

Borehole seismic data can be utilized to refine surface seismic data prior to drilling production wellbores. Borehole seismic data can further be gathered on a continuing or recurrent basis to monitor subsurface formations and reservoirs during production of the well. The gathering of data on a continuing basis will assist in optimizing extraction of gas or oil deposits.

Borehole seismic surveys are conducted by placing the receivers in the borehole and operating a seismic source at the surface to generate an acoustic wave. Typically the receivers are placed in a shuttle and deployed downhole for the duration of the survey and then removed. The amount of information that can be obtained in borehole seismic surveys can be limited by the logistics of deploying the shuttles downhole.

It is known for acoustic sensors or receivers to be permanently deployed downhole to continuously monitor seismic data during production of a well. The sensors are typically deployed with a monitoring tool that extends downhole and is integrally attached to the borehole casing. The attachment means is typically a mechanical surface force clamping device and the sensors are typically housed in a side passageway or lateral extending section associated with the sensor housing or production tubing which is laterally displaced from the primary flow passageway through the production tubing. See, for example, U.S. Pat. No. 6,253,848 issued Jul. 3, 2001 to Reimers et al. The permanent deployment monitoring tooling such as that taught in Reimers et al, cannot typically be retrieved or removed without destroying the wellbore rendering the tool and sensors unusable for future borehole seismic operations.

Many monitoring tools for permanently deploying seismic sensor arrays downhole are single level monitoring tools. However, due to the complex subsurface formation and strata and the various levels of the multiple production zones and reservoirs, multilevel monitoring tools are also required to monitor various levels simultaneously. The monitoring tool that deploys the sensor arrays will typically include a plurality of sensor housings or shuttles where each shuttle contains at least one sensor. While a plurality of shuttles is desirable, an excessive number of shuttles can result in an overly complex tool that is very large and difficult to deploy. The total number of shuttles is typically eventually limited by the general power consumption requirements of the downhole sensor, telemetry and clamping system. In general, a tool based on the general tool architecture as outlined above can quickly become large and complex when trying to increase the number of shuttles, resulting in system that is both expensive and difficult to deploy. Due to system cost and high lost-in-hole risks, it can be impractical to deploy such a system permanently in a well. The number of shuttles is also limited due to power consumption requirements, costs and difficulty of deployment. Known borehole tools, including those utilizing fiber optic sensors, designed for permanently deploying sensor arrays typically include a surface force clamp attachment means for attaching the sensor arrays to the borehole casing. This type of attachment means results in a monitoring tool that is not retractable or reusable at a different site. A borehole sensing apparatus that is not easily removably deployed into a borehole and which cannot be retrieved and reused in other boreholes is a problem that exists.

Similarly in the area of borehole logging, the number of transmitters and receivers and the distance between transmitters and receivers has been increasing to improve the ability to detect formation characteristics in the undisturbed formation farther from the borehole. One method to get deeper penetration is to increase the distance between source and receivers, such that the receivers are detecting signals that are returned from further distances in the borehole. A problem with increasing the distance between sources and receivers is that increasing tool size can result in increasing difficulties in deployment, longer periods of time required for logging, longer down-time for the well, and higher costs. There is a need for expanding the distance between acoustic sources and receivers, or utilizing additional receivers without increasing tool size.

The use of a magnetic clamping device as a method of attachment can also optionally be utilized to attach the sensors. However, the ability to magnetically clamp and unclamp the sensor downhole or at the well head does not resolve all retrieval problems because many times the tool, specifically the weight or main electronics cartridge, gets stuck downhole. Magnetic clamping alone will not address the issue of the stuck tool.

Accordingly, the present invention is operable to overcome one or more of the problems as set forth above.

BRIEF SUMMARY OF INVENTION

One embodiment of the invention is an apparatus and a method of removably deploying the sensor arrays comprising the steps of extending a coiled tube, or other suitable conveyance such as a cable line, wire line or slickline downhole into a survey borehole where the coiled tube or other suitable conveyance comprises a plurality of shuttles attached thereto and where the shuttles include seismic sensor systems and a magnetic clamp in a non-magnetic clamping state, and then magnetically clamping the shuttle to the borehole casing. The method can also include the steps of magnetically unclamping the plurality of shuttles and retracting the deployment mechanism removing the shuttles from the borehole. The method can also include steps of magnetically unclamping the plurality of shuttles, repositioning the shuttles in the borehole, and reclamping the shuttles. Any of the steps of deploying, clamping, repositioning, reclamping and can be controllably executed at the surface.

Also, as noted above, a magnet clamp is utilized to couple the shuttle to the borehole casing. The magnet clamp is more compact compared to typical mechanical surface force clamping devices utilized in the industry because it does not involve engagement of or movement of mechanical parts exposed outside shuttle. Also, the magnet clamp does not have to be positioned in a side passageway away from the primary flow passageway of the well and its use eliminates the need for mechanical anchoring arms thereby further reducing the shuttle size. One embodiment of the magnet clamp comprises a surface hydraulic actuator control system adapted to hydraulically control a downhole actuator for positioning of a magnet to engage or disengage the shuttle. Electrical actuator control systems can likewise be used. The magnetic clamp is a clear improvement over the typical mechanical surface force clamping because the seismic sensor system can be retracted and utilized in different boreholes. However, as indicated above the magnet clamp does not address the issue of a stuck tool.

Another embodiment can comprise a conveyance having a sensor section where the various sensors are attached and a weak point in the conveyance below the small outer diameter sensor section and where the larger outer diameter main electronics cartridges, weights or other larger components are attached to the conveyance below the weak point. This embodiment facilitates fishing a stuck tool and if necessary breaking away the upper portion of the conveyance at the weak point.

Another embodiment of the invention incorporates bow springs with the shuttle for facilitating coupling and decoupling of the sensor. The bow spring can be adapted to extend the shuttle away from the conveyance toward the borehole casing and retract the shuttle against the conveyance One embodiment utilizes hydraulic power to control the position of the magnet clamp in lieu of electrical power. In this embodiment, the hydraulic pressure from the surface positions an actuator which controls the position of the magnet for clamping and unclamping. The wire line and the plurality of shuttles can be spooled downhole either in an unclamped state or a clamped state. In permanent monitoring applications, the magnet clamp can be activated because in such situations hydraulic activation or deactivation would not be required. For permanent monitoring applications, the magnets can be spooled in an activated state and deployed directly into the well bore as the well bore is established.

One embodiment of the present invention is an apparatus and method that utilizes the benefits of fiber optic communication and sensor systems combined with a plurality of shuttle devices attached along a coiled tubing, or a cable line, wire line, slickline, or other suitable downhole deployment means. The shuttle provides a housing for the sensors and each shuttle has a magnetic coupling clamp which enables the present invention to effectively and removably deploy or spool seismic sensor arrays downhole into a survey borehole for recording multi-level three-dimensional borehole seismic data. The borehole monitoring or deployment tool comprises a coiled tubing, or a cable line, wire line, slickline or other suitable conveyance for extending a plurality of shuttle devices containing fiber optic seismic sensors where the shuttle devices have a magnetic coupling clamp controllably operable to fixedly engage and acoustically couple the shuttle to the borehole casing. The magnetic clamp is further controllably operable to disengage and uncouple the shuttle from the borehole casing.

When the present invention utilizes fiber optic sensor systems, it benefits from many advantages offered by fiber optic systems. For example, fiber optic systems can operate passively and therefore downhole electronics and associated power from the surface to operate the downhole electronics are not required. The ability to eliminate downhole electronics improves reliability of the downhole sensor system particularly in higher temperature environments. The electronics necessary for operating the sensor arrays can be located at the surface and since the surface electronics can be relatively expensive, they can be shared with other wells and utilized for multiple downhole fiber optic sensor systems. Also, fiber optic technology allows for a smaller profile and lighter weight system. Still further, all of these capabilities are advantageous for acoustic and seismic imaging applications which require a large sensor array with high data transmission capabilities. In this regard, fiber optic sensors can also support multi-functional measurements through the fiber optic line. This feature has great advantage in wire line or cable line applications as well as production and formation monitoring sensor systems.

A further embodiment of the present invention comprises a method of calibrating a borehole sensing system including providing a fiber optic sensor section on a conveyance system comprising a fiber optic communication fiber, where the sensors are communicably linked and acoustically coupled to a transducer and conveyance system comprises at least one fiber optic communication fiber; communicably linking the fiber to an optical electronics converter and communicably linking said optical electronics converter to said transducer, introducing a optical signal into the communication fiber, activating the transducers through detection of said optical signal by said fiber optic sensors, exciting said fiber optic sensors by activation of transducers, measuring response of the sensors, determining expected response of the sensors based on input optical signal; and comparing measured response to expected response of said fiber optic sensors.

The above discussed features of the present invention as well as other features and advantages will be described further in the following detailed description of the drawings and will be appreciated by and understood by those skilled in the art.

BRIEF DESCRIPTION OF THE DRAWINGS

For a better understanding of the present invention, reference may be made to the accompanying drawings in which:

FIG. 2 is an enlarged diagrammatic view of a cutaway from a portion of the borehole revealing the cable line extending therethrough and the shuttle attached thereto;

FIG. 3 is a cross section of a shuttle revealing the borehole sensors and the magnet clamp;

FIG. 4A is a cross section of the magnet clamp showing the hydraulic actuator and the magnet element in the clamp position;

FIG. 4B is a cross section of the magnet clamp showing the hydraulic actuator and the magnet element in the unclamped position;

FIGS. 7, 7a and 7b is a tubing conveying tool with a bow spring to shuttle interface;

FIG. 10 is a wire line system view showing fishing head.

DETAILED DESCRIPTION OF INVENTION

Figure 1:
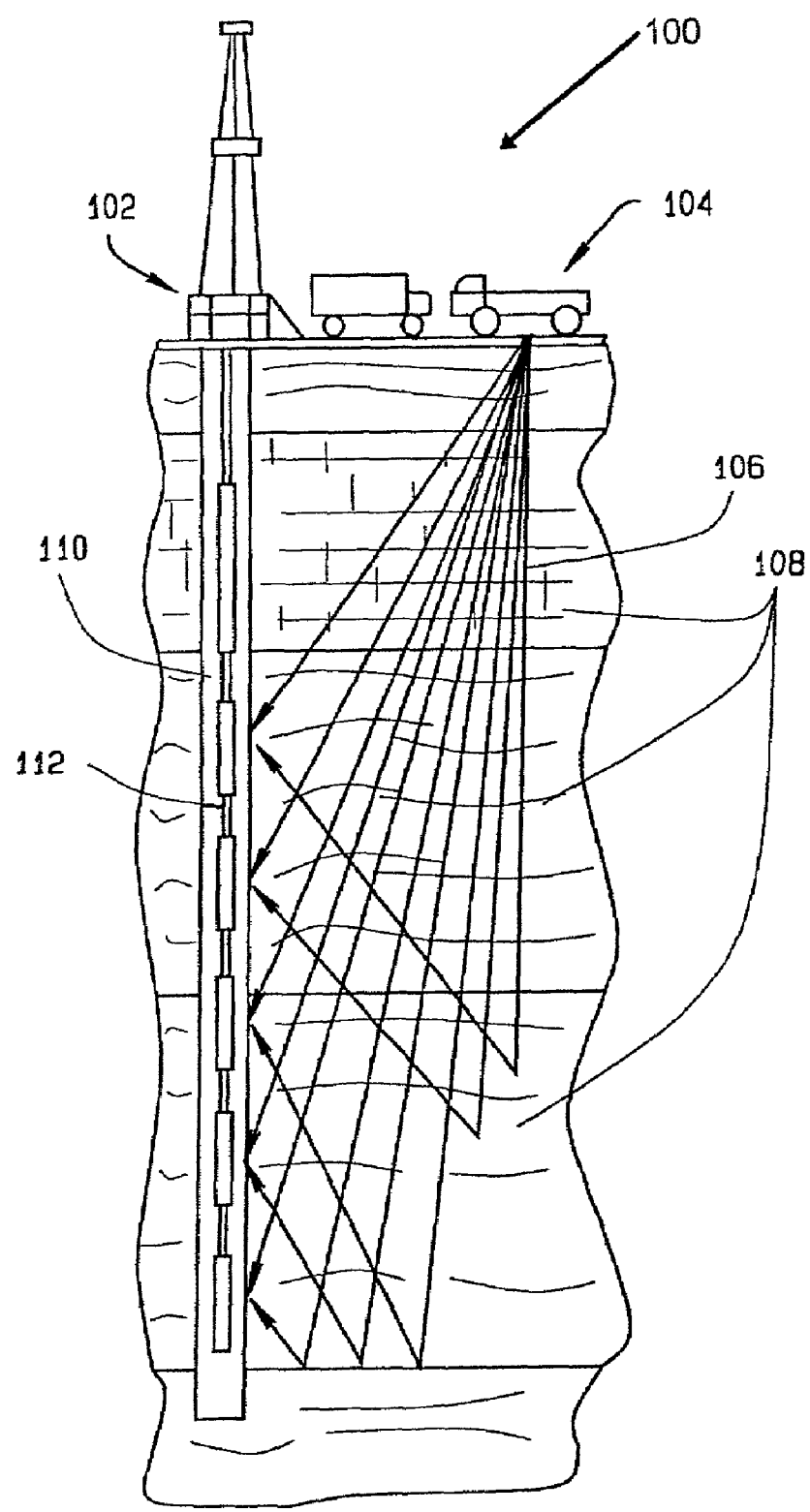
FIG. 1 is a diagrammatic view depicting a typical well site with a representation of a cross section of the subsurface formations with a borehole extending therethrough.

The present invention provides an apparatus and method for removably deploying seismic sensor arrays down a borehole or wellbore for efficiently recording subsurface seismic data. The apparatus is designed such that a plurality of seismic sensors or seismic sensor arrays can be deployed down a wellbore by spooling down a plurality of seismic sensors attached to a wire line (cable line), slickline, coiled tubing or other suitable deployment mechanism. For purposes of this disclosure, when any one of the terms wire line, cable line, slickline or coiled tubing or conveyance is used it is understood that any of the above-referenced deployment means, or any other suitable equivalent means, may be used with the present invention without departing from the spirit and scope of the present invention. One embodiment of the apparatus is designed with a plurality of shuttle containers or simply shuttles, each shuttle containing a sensor array with the shuttles being attached along the wire line, coiled tubing or other deployment mechanism. The apparatus is adapted to lower or spool the wire line down the borehole then actuate a magnetic clamp integral with the shuttle to magnetically clamp and acoustically couple the sensors to the borehole casing. The apparatus is further adapted to deactuate the magnetic clamp, thereby unclamping the shuttle and sensors from the borehole casing. The apparatus is further adapted to retract the wire line and the plurality of shuttles and sensors attached thereto. The extending or retracting of the wire line or cable line can be accomplished by a spooling mechanism.

One embodiment of the invention entails the deployment of a plurality of shuttle devices having sensor arrays downhole into a well bore and then actuating a magnetic clamp, or simply magnetically clamping and acoustically coupling the shuttle to the borehole casing.

One embodiment of the invention comprises a sensor package which includes the borehole sensors and the magnet clamp as one integral unit or sensor package. With this embodiment, clamping results in the sensor package being clamped against the wall of the shuttle and the entire shuttle then being clamped against the borehole casing. This results in acoustic coupling between the sensor package, shuttle and casing. Please note however that one embodiment of the invention can comprise a sensor package designed to be already acoustically coupled to the shuttle without magnetic clamping whereby the magnet clamp only needs to clamp the shuttle to the borehole casing or any other adjacent structure. This embodiment is not shown in the drawing but would be clear to one of ordinary skill and is well within the scope of this invention. Once the borehole data has been gathered, the apparatus is operable such that the magnet clamps can be deactuated such that extracting the sensor arrays can be performed.

An alternative embodiment of a conveyance tool comprises a coiled tubing as a method of conveyance and a shuttle attached thereto by a bow spring. When the coiled tubing is deployed, the bow spring can be collapsed against the tubing such that the shuttle attached thereto will be held against the exterior of the tubing. A magnet attached on the exterior of the tubing an aligned with the magnet clamp is designed to facilitate holding the shuttle against the tubing. When the coiled tubing tool is deployed to the appropriate depth or position, the bow spring tension can be released thereby extending the shuttle outward from the tubing toward the borehole casing. This configuration is adapted to further facilitate coupling the shuttle to the borehole casing.

Another embodiment of a shuttle having a magnetic clamping device comprises a wire line conveyance with a two-part shuttle attached thereto. The two-part shuttle comprises an exterior cradle shuttle portion and a main sensor shuttle portion attached thereto by a bow spring. The main sensor shuttle portion contains the sensing devices similar to the shuttle described in FIGS. 2 through 4. When the bow spring is collapsed within the exterior cradle shuttle portion, the main sensor shuttle portion is cradled therein. When the tension of the bow spring is released, the main sensor shuttle extends outward from the exterior cradle shuttle portion. This embodiment also further facilitates coupling the shuttle to the borehole casing.

Yet another embodiment of a conveyance tool for the present invention comprises a shuttle embedded in a wire line conveyance. The shuttle is designed to be embedded in the wire line such that the outer diameter of the shuttle is approximately the same as the diameter of the wire line conveyance. The shuttle again is a two-part device comprising an exterior cradle shuttle portion and a main sensor shuttle portion attached thereto by a bow spring. As described above, the bow spring interface is designed to retract and extend the main sensor shuttle portion.

Another embodiment comprises a borehole sensing system have a breakaway system. The breakaway system is designed such that the conveyance has a sensor section where the sensors are attached and the conveyance has its weakest point at the base of the sensor section such that the conveyance could be broken at that weakest point to recover the upper portion of the tool including the sensor section while leaving the portion of the tool below the breakaway point for later retrieval. A further embodiment provides a tension-sensing device to sense tension in the conveyance. Such a breakaway system may be incorporated into any of the embodiments above.

Another embodiment comprises a method for obtaining geophysical information about subsurface formations comprising deploying a shuttle, having a sensor package therein in a borehole for sensing data where the sensor package has a magnet clamp operable to selectively magnetically clamp the shuttle to an adjacent structure is attached to a conveyance; selectively clamping said shuttle to the adjacent structure with said magnet clamp acoustically coupling together the sensor package, the shuttle, and the adjacent structure; deploying an acoustic source into the borehole; generating an acoustic signal in the borehole; and sensing borehole data with said sensor package. A particular embodiment comprises deploying an acoustic source disposed in a sonic tool into the borehole.

Referring to FIG. 1, a diagrammatic view of a well site is shown with a diagrammatic representation of a cross section of the subsurface formations with a borehole extending therethrough. The diagrammatic view 100 depicts well instrumentation 102 at the surface including all associated instrumentation and monitoring systems. Also shown at the surface is a surface source 104 which is depicted as a vibration vehicle. Alternatively, the source 104 may be an acoustic source deployed into the borehole 110 for generating an acoustic signal in the borehole. The plurality of lines 106 are intended to represent excitations or seismic vibrations traveling through the subsurface formations producing seismic data that can be sensed by downhole sensor arrays. The present invention can be utilized to record seismic data for conducting a seismic survey of the subsurface formations 108. The present invention can also be utilized to control and monitor operations during production by monitoring seismic data from the various subsurface formations, regions, and zones. In the monitoring capacity, the present invention can be utilized to optimize production of the well. The placement of the well bore 110 can be strategically located based on known seismic survey data that may have been previously obtained. Optimal placement of the well bore is desired such that optimal recording of seismic data for the subsurface formations of interest can be obtained.

Once the well bore has been established, a wire line (cable line) 112, a coiled tubing or other conveyance can be spooled to extend down through the well bore where the plurality of sensor arrays are positioned along the wire line 112. Also, note that the wire line with the seismic sensors attached thereto can be extended as the well bore is being established. The present invention can be either permanently deployed for continuous production well monitoring or can be temporarily deployed for performing a subsurface seismic survey and then retracted. If the present invention is temporarily deployed, it can be reutilized in a subsequent well bore operation once it has been retrieved. This feature provides a great advantage over other systems presently available. If the present invention is permanently deployed it can continuously monitor production well operations. Once the wire line and the plurality of sensor arrays are in position, seismic data can begin to be gathered. If production ceases at the well or for some other reason seismic monitoring is no longer required, the system can be retracted and reutilized elsewhere. Note that the diagrammatic illustrations presented herein to describe the present invention are for the purpose of illustration and ease of understanding the apparatus and methods of the present invention. The diagrammatic illustrations shown and described herein should not be construed to be limiting in any way with respect to the scope of the present invention.

Referring to FIG. 2, a diagrammatic view of a cutaway from a portion of the borehole casing is shown with the cable line or wire line extending therethrough having a shuttle attached thereto. In this view, a portion of the borehole casing 202 is shown with a sectional cutaway revealing the wire line 112 and a shuttle carrier 204 attached thereto. The wire line with the shuttle attached thereto can be spooled to extend down through the borehole as indicated by arrows 206. A shuttle 204 houses a borehole sensor array and a magnetic clamping device utilized to acoustically couple the shuttle and sensors to the borehole casing. The wire line 112 can include at least one communication line and can include at least one hydraulic pressure line. One embodiment of the communication line can be fiber optic to interface with a fiber optic acoustic sensor device for uphole transmission of seismic data. The hydraulic line can be any appropriate actuator line, electronic or otherwise, that is adapted to actuate the magnetic clamp.

Referring to FIG. 3, a cross section of a shuttle revealing the borehole sensors and the magnetic clamp is shown. The shuttle carrier 204 is attached to the wire line 112. Internal to the shuttle housing is a fine wire suspension 302 which is part of an acoustic isolator 304 which acoustically isolates the sensor package 308 from the shuttle 204. The shuttle and sensor package is designed to be mechanically reliable and acoustically robust to isolate the sensor package from the dynamics of the wire line or cable line 112 and to insure independent seismic recording at each shuttle and sensor package. The acoustic isolation system includes a fine wire suspension line 302 integral with an acoustic isolator which acts as a suspension spring with a high damping factor between the carrier (shuttle) and the sensor package 308. In one embodiment, the acoustic isolator 304 can be three quad rings attached to the fine wire suspension that in combination act as a suspension spring. One example of fine wire suspension is fine wire rope. However, the acoustic isolator can be any appropriate suspension spring-type mechanism. The acoustic isolation system is designed such that the motion of each sensor package becomes independent and is protected from the noise transmitted through the wire line 112. This allows seismic signals to be acquired without interference from any dynamics of the shuttle carrier 204 and the wire line 112. Also, by separating the heavy part of the shuttle from the sensor part, the ratio of the clamping force to the moving mass increases. This provides better coupling conditions between the sensor package and shuttle combination and the casing. Also, when the wire line and shuttle is dragged upward, the fine wire suspension pulls up the sensor package. With the magnetic damper 306 on, the fine wire suspension allows the sensor package to align with, and at the same time, be in full contact with the borehole casing, thereby establishing a good coupling condition during the drag operation. The drag operation can be utilized when an undesired rocking motion is occurring. Rocking motion occurs when the sensor package has not established good contact. The sensor package under these conditions will begin a seesaw motion. A solution to this problem is to perform the drag upward operation to establish a stable contact. Although it is generally preferred to use the above described acoustic isolation system, it is also recognized and anticipated that the sensor package can be acoustically coupled to the shuttle through a wide variety of other means including being permanently affixed to the interior of the shuttle prior to being deployed downhole.

One embodiment of the invention utilizes fiber optic geophones as the borehole sensors for converting present seismic waves into electro-optical signals that can be transmitted across fiber optic communication lines. For this embodiment of the invention, fiber optic communication lines may be utilized in the cable line for transmitting seismic data uphole.

The same sensor package devices can be utilized for both the non-bow spring configurations shown in FIGS. 2 through 4 and the bow spring configurations shown in FIGS. 7 through 9 to be discussed below. Also, one embodiment of the present invention can be designed such that the sensors provide triaxial capability or three-dimensional capability whereby each shuttle comprises a sensor array of at least three mutually orthogonal geophones which are fixed relative to the sensor package geometry. In another embodiment, each shuttle comprises a hydrophone. Each of the shuttle and sensor packages that are installed along the wire line will monitor and record seismic activity at its respective depth.

Referring to FIGS. 4A and 4B, a schematical representation of the damper is shown in both its actuated damper on position, FIG. 4A, and its deactuated damper off position, FIG. 4B. Also shown in FIGS. 4A and 4B is a schematic representation of sensors 414. Also shown is an actuator device 410 for positioning the permanent magnet. The magnetic damper and sensor package in shuttle carrier 204 includes a cylindrical shape permanent magnet 402 that is polarized in the radial direction. The permanent magnet is reciprocably mounted in pole pieces 406 such that it can reciprocably rotate about its cylindrical axis. The magnet position as shown in FIG. 4A is representative of the magnetic damper on position or the acoustic clamping position as shown by arrow 408. FIG. 4B shows a magnet position representative of the magnetic damper off position or release position as shown by arrow 409. The magnetic damper is activated when an actuator turns the permanent magnet 402 90 degrees from the position shown in FIG. 4B to the position shown in FIG. 4A. When the magnetic damper is in the release position as shown in FIG. 4B, magnetic flux 404 is redirect to be closed or contained in the pole piece 406 to prevent magnetic flux leakage. When the magnetic damper is in the clamped position as shown in FIG. 4A, magnetic flux 403 is redirected to go outside of the pole pieces such that the flux comes out of either pole piece and goes back through the casing to the other pole piece generating a strong clamping force. The clamping force is perpendicular to the casing as shown by arrow 408. The magnetic clamper, integral with the sensor package 308, is lightweight making the effective clamping mass small. The actuator for rotating the cylindrical permanent magnet 90 degrees is shown as a hydraulic actuator 410. The hydraulic line 412 allows for remote actuation of the hydraulic actuator 410 adapted to rotate the cylindrical magnet 90 degrees. The actuator 410 could be actuated by any other appropriate actuator means such as an electrical actuator or an electro-mechanical actuator and an appropriate corresponding signal line would replace the hydraulic line. The same magnetic sensor device discussed above can be utilized for the bow spring shuttles described in FIGS. 7 through 9.

Also shown in FIGS. 4A and 4B is a representation of a seismic sensor 414. The seismic sensor is a device for sensing and converting seismic waves into electro-optical signals. Examples of seismic sensors include hydrophones, geophones, fiber optic geophones, three-axis seismic sensors, or geophone accelerometers.

Figure 5:
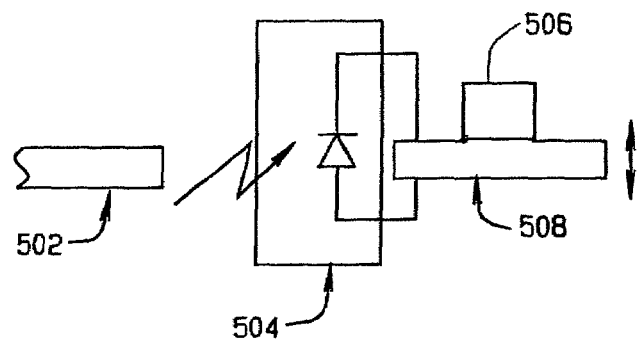
FIG. 5 is a representative schematic of a downhole arrangement showing the use of a fiber optic sensor.

Referring to FIG. 5, a representative schematic of the downhole fiber optic sensor with downhole calibration capability is shown. FIG. 5 shows a fiber optic communication fiber 502 communicably linked to an optical electronics converter 504 which is further communicably linked to the fiber optic seismic sensor 506 and the transducer 508 utilized for calibration. Types of transducers include piezoelectric transducers and electromagnetic transducers. One particular embodiment provides piezoelectric transducers. One embodiment of a calibration technique is shown where calibration can be performed without downhole power supplies or other complicated downhole electronics. Downhole calibration is advantageous to quantify the sensor response. The combination of an optical electronics converter 504 and a transducer 508 allows the downhole calibration of the fiber optic geophone to be performed in-situ with minimal downhole electronics. One method is to provide a light source through the optical fiber. The photo detectors of the fiber optic geophone will produce the modulated photo current which will activate the piezoelectric transducers. The transducers are acoustically coupled to the fiber optic geophones and excite the geophones as shakers. Calibration is allowed because of the known input signal and the expected response. The same fiber optic communication line can be shared for both measurement and calibration signals. A further embodiment includes providing a capacitor in communication with the transducers 508 to provide energy for activating the transducers 508. One method to store energy in the capacitor is to provide opti-electric converters in conjunction with the capacitors and to charge the capacitor with a light provided to the optical fiber.

Figure 6:
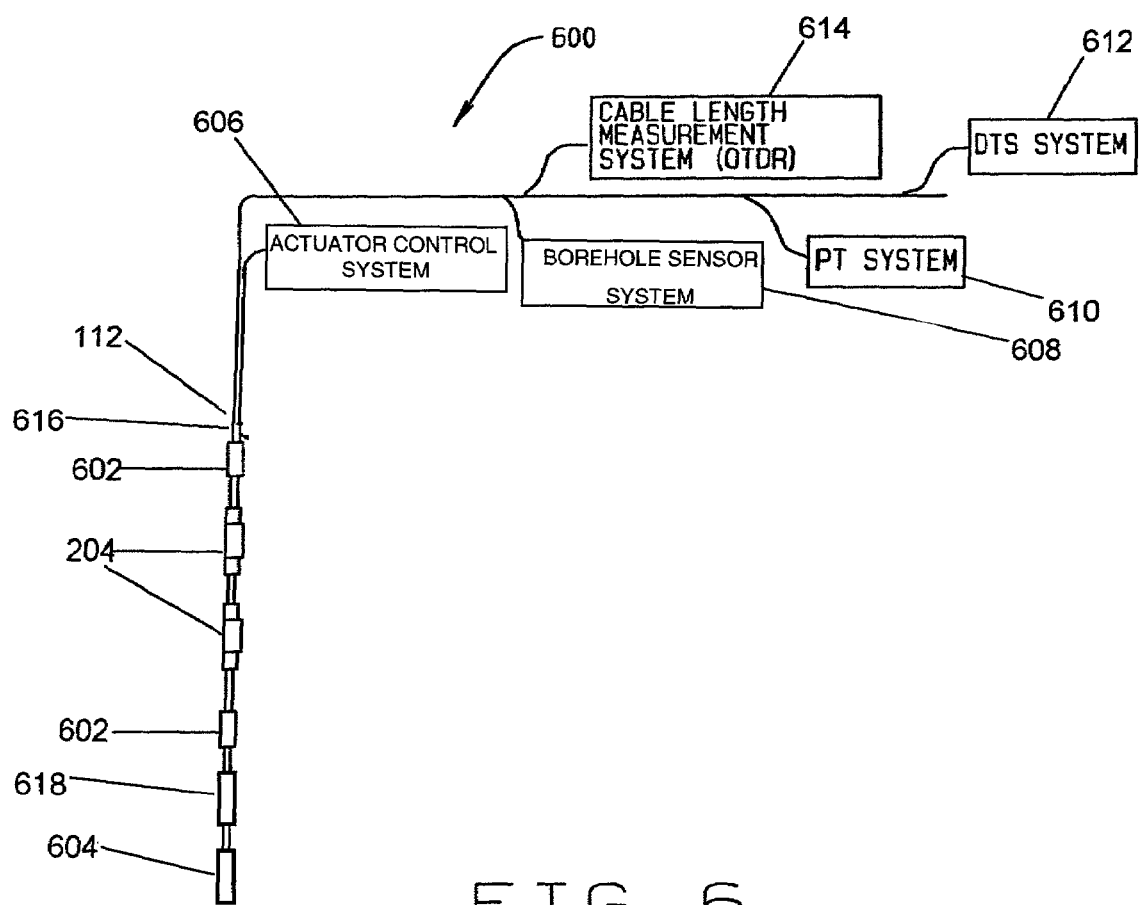
FIG. 6 is a functional diagram of the borehole seismic sensing system.

Referring to FIG. 6, a functional diagram of one embodiment of the borehole sensing apparatus 600 is shown. The apparatus 600 includes a plurality of shuttles 204 along the cable line 112 that contains a sensor and damper package. Other sensors 602 can also be attached along the wireline such as the pressure/temperature (P/T) sensors shown in FIG. 6. The wire line 112 can be adapted to carry various communication lines, including fiber optic sensor array communication lines for the fiber optic system. The wire line 112 can also be adapted to carry the hydraulic line or electrical line actuator control for actuation of the magnetic clamper. Also shown in FIG. 6 is a downhole battery 604 that can be utilized to support various power needs. Various monitoring and control systems can be located at the surface such as the actuator control system 606 which can be operable to control actuation of the magnet clamp. The borehole sensor system 608 can monitor, store, and interpret the data output by the sensors. Also, a P/T sensor system 610 can be located at the surface and communicably linked to a downhole sensor to monitor down-hole pressure and temperature. Still further, a distributed temperature sensor 616 is shown, which is communicably linked to a distributed temperature sensor (DTS) system 612 for providing a continuous temperature profile. Also, a cable length measurement system 614 such as an Optical Time Domain Reflectometer (OTDR) system as shown as the surface can be used. Electrical cartridge 618 is shown on the conveyance below the sensor section. In a further embodiment, the borehole sensors are seismic sensors.

Referring to FIGS. 7, 7a and 7b, a tubing-conveying tool with a bow spring to shuttle interface is shown as an alternative embodiment. The tubing tool 700 is shown comprising a coiled tubing 702 with a shuttle 704 attached thereto by bow spring device 706. The shuttle can be similarly configured as the shuttle described in FIGS. 2, 3, and 4 including the magnet clamp and the sensor package. FIG. 7 illustrates the position of the shuttle when the tension of the bow spring 706 is released, and when the shuttle is extended outward and away from the tubing. The bow spring 706 and shuttle 704 can held against the tubing FIGS. 7, 7a and 7b show how the shuttle can be used with a bow spring mechanism that attaches the shuttle to the coiled tubing. When the coiled tubing is deployed, the bow spring can be collapsed against the tubing. A protective mounting, cover, or other such device larger than the shuttle 704 can be provided to hold bow spring 706 against tubing during deployment to protect shuttle 704 from damage during deployment. The magnets 708 attached to the exterior of the coiled tubing and the shuttle can be configured to magnetically attract each other to further hold the shuttle against the tubing. Once the desired depth has been reached, the magnet on the sensor package can be activated via the actuator control line 712 to reverse its polarity such that the shuttle moves away from the coiled tubing by combination of the opposing magnetic forces and the release of the tension on the bow spring. Alternatively the magnet 708 on attached to the conveyance can be activated via an actuator control line to reverse its polarity. To retract the shuttle, the magnet can again be reversed. The forces of the magnets are such that they are greater than necessary to collapse the bow spring. FIG. 7a depicts the bow spring in its collapsed position such that the shuttle 704 is collapsed against the magnet 708. FIG. 7b depicts the tension of the bow spring being released thereby extending the shuttle outward and away from the tubing for coupling to the borehole casing 710. The bow spring configuration facilitates coupling of the shuttle to the borehole casing such that establishment of the coupling relationship is not totally reliant on the magnet clamp.

Figure 8A:
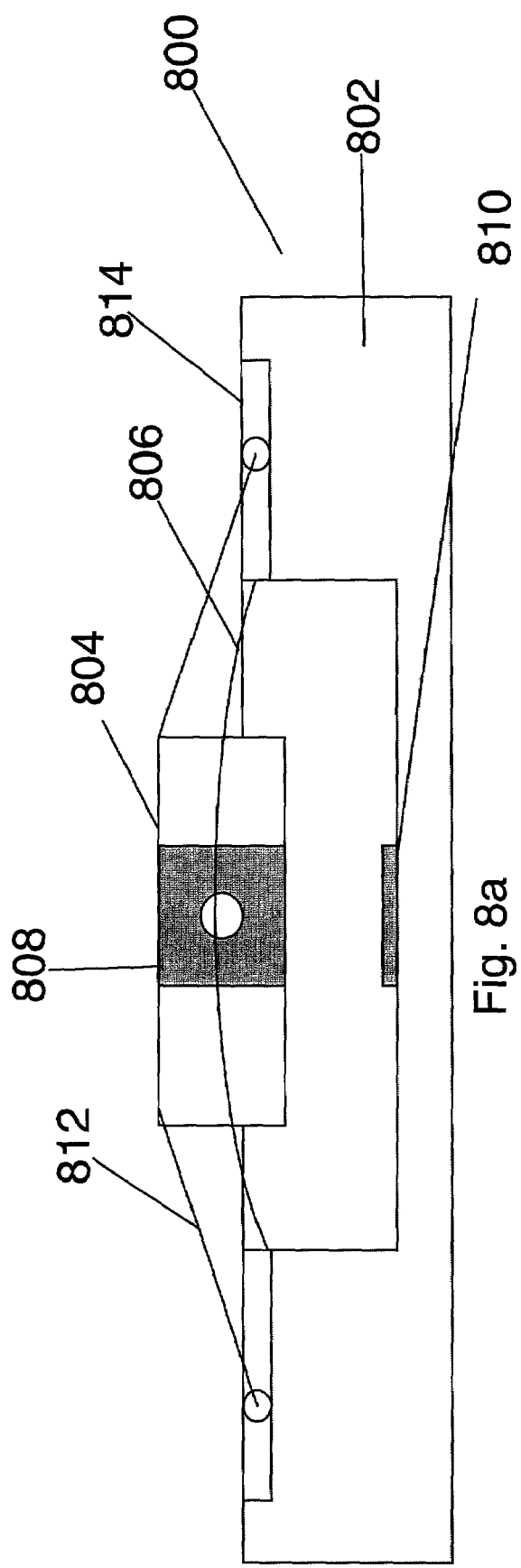
FIGS. 8 and 8a show a bow spring shuttle and wire line conveyance.
Figure 8:
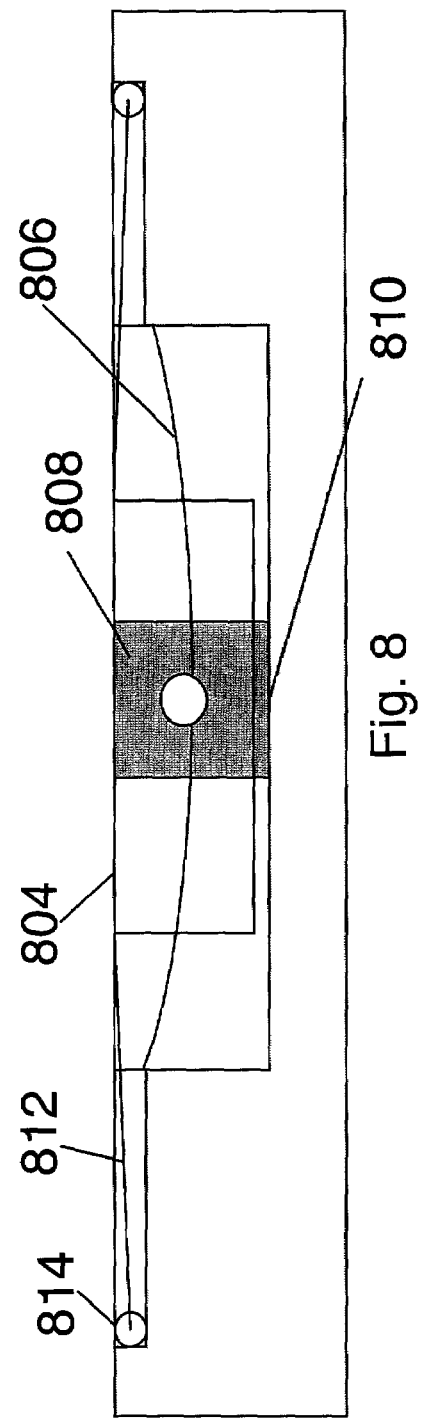

Referring to FIGS. 8 and 8a, a bow spring two-part shuttle for a conveyance is shown. The two-part shuttle 800 comprises an exterior cradle shuttle portion 802 and a main sensor shuttle portion 804 attached thereto by a bow spring mechanism 806. FIG. 8 shows the two-part shuttle with the bow spring collapsed inside the exterior cradle shuttle portion such that the main sensor shuttle portion is cradled within the exterior cradle shuttle portion. The collapsing of the bow spring pushes the main sensor shuttle portion inside which is further facilitated by the attractive magnetic forces between the magnetic clamp 808 of the main sensor shuttle portion 804 and the magnet 810 attached to the interior of the exterior cradle shuttle portion. A guide 812 and slider 814 mechanism can further facilitate collapse of the bow spring. The exterior cradle shuttle portion can be attached to a wire line and the main sensor shuttle portion can be extended or retracted by the bow spring in combination with the magnetic forces of the magnetic clamp 808 and magnet 810. The extension of the main sensor shuttle portion outward from the exterior cradle shuttle portion as shown in FIG. 8a further facilitates coupling the shuttle to the bore hole casing similar to the shuttle configuration shown in FIG. 7. Again the bow spring facilitates coupling the shuttle to the borehole casing.

Figure 9A:
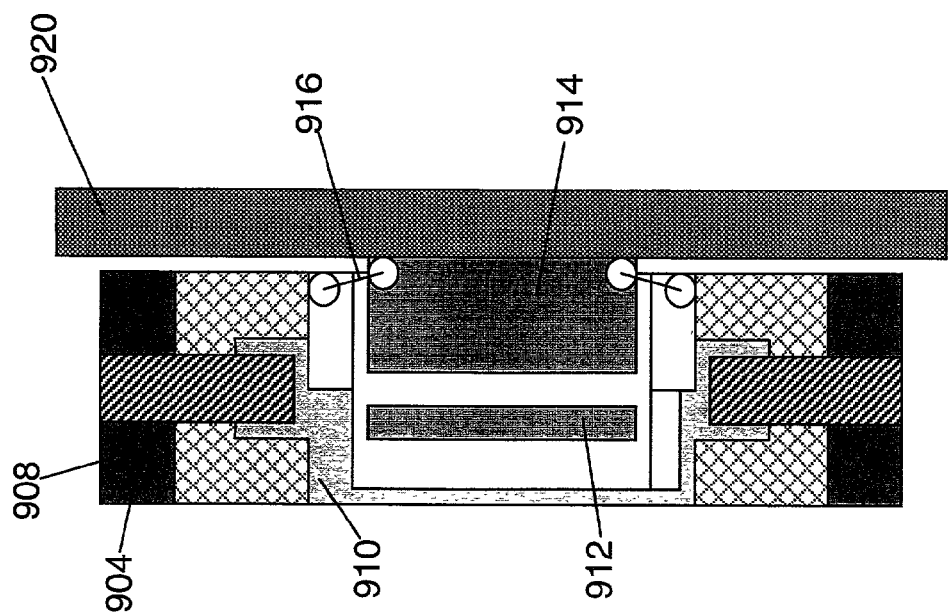
FIGS. 9 and 9a show a shuttle embedded in the wire line with bow spring to sensor package interface.
Figure 9:
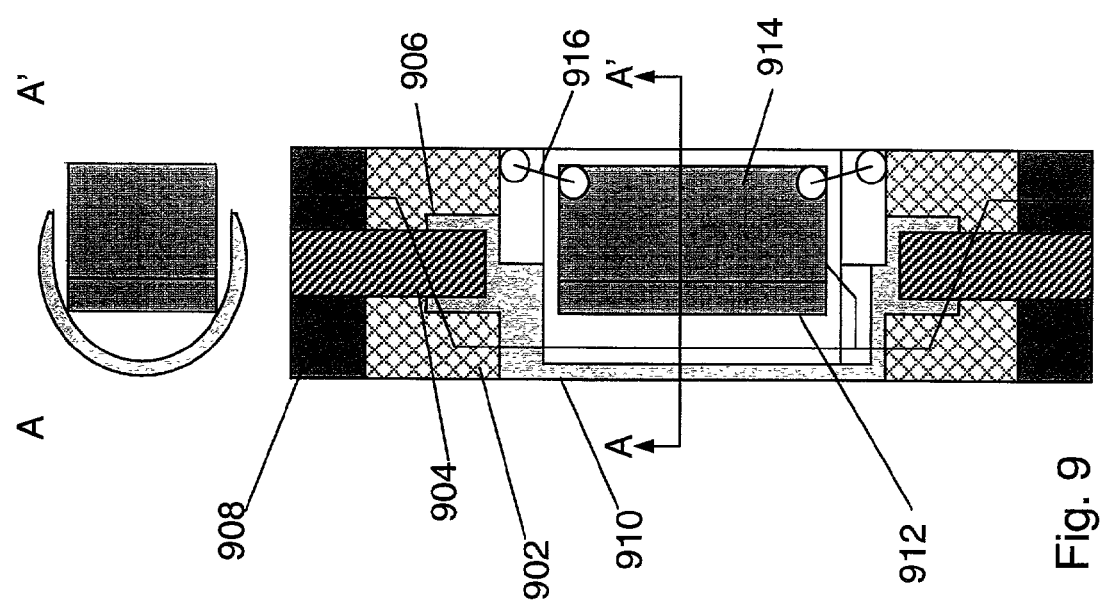

Referring to FIGS. 9 and 9*a*, a shuttle embedded in a wire line having a bow spring interface is shown. The two-part shuttle design shown in FIGS. 9 and 9*a* has similar functionality to the shuttle shown in FIGS. 8 and 8*a*. However, for this embodiment, the shuttle is embedded in the wire line conveyance. The shuttle is embedded and fixed within the conveyance by the mold portion 902. The shuttle is further fixed and embedded within a cable by a stress core 904 and a swage 906. The cable jacket 908 has an outer diameter that is approximately the same as the shuttle device. The shuttle comprises an exterior cradle portion 910 having a magnet 912 therein. The main sensor shuttle portion 914 of the shuttle is attached to the exterior cradle portion 910 by a bow spring mechanism 916. FIG. 9 shows the bow spring in its collapsed position such that the sensor package portion 914 of the shuttle is collapsed within and cradled within the exterior cradle portion 910. Collapsing of the bow spring 916 is facilitated by the attractive forces between the magnet 912 and the magnetic clamp contained within the main sensor package portion 914. FIG. 9*a* shows the sensor package portion extended outward from the cradle portion of the shuttle to establish a coupling interface between the shuttle and the borehole casing 920.

One embodiment of the borehole sensing apparatus of the present invention as a wire line system is shown in FIG. 10. FIG. 10 is a wire line system view showing the use of a fishing head for retracting a stuck tool. The wire line system tool 1000 is shown comprising a main cable or conveyance 1002, a sensor section 1004, an active fishing head 1006 and a main electronics and weight portion 1008. The sensor section of the tool has a smaller outer diameter than the active fishing head so that an overshoot of a fishing head can run over the sensor section. The shuttles having sensor packages are attached along the sensor section of the conveyance tool. The main electronics and weight portion 1008 can have a larger overall diameter than the overshoot. The weight portion 1008 can also have a protruding end to fit into the overshoot. The protruding end can also be magnetic to attract the overshoot. The active fishing head can optionally have a sensor to detect latching of the overshoot to determine the point where the tool is stuck. Alternatively, a sensor such as a tension meter can be installed in the fishing head or as another alternative a distributed tension measure wire can be installed in the sensor section of the conveyance for sensing tension in the conveyance indicative of a lower portion of the tool, such as the electronics and weight portion 1008, being stuck. A communication line can be provided for transmitting this tension sensing data to the surface. The wire line system tool can be designed such that the portion of the conveyance at the bottom of the sensor section has a weak point so that it is possible to cut and retrieve the sensor section and then subsequently fish the main electronics and weight later. This wire line system tool design enhances the capability of retracting the tool for reuse. If a tool gets stuck it is likely that the larger components of the conveyance will be the components to get stuck. Configuring the conveyance tool such that the larger main electronics and weight are positioned below the sensor section and such that a weak point in the conveyance is positioned there between will allow the conveyance to be cut by applying tension when the larger component is stuck. Once the conveyance is cut the sensor section can be retrieved while leaving the stuck component downhole to be fished later.

A further embodiment comprises providing at least one tension-sensing device on the conveyance at the surface. The tension determined in the conveyance at the weak point can be compared to the tension determined in the conveyance at the surface. Such a comparison can indicate that whether the apparatus is stuck above or below the weak point and can be used in determining actions such as to fish or to break the conveyance.

INDUSTRIAL APPLICABILITY

The present invention has applicability for both performing borehole surveys for planning well bore drilling and production and for monitoring borehole data during actual well production. Such borehole surveys include borehole seismic surveys and such monitoring of borehole data includes temporary or permanent monitoring. One embodiment of the present invention comprises a plurality of shuttles comprising borehole sensor attached along a cable line and spooled down the borehole for permanent or temporary monitoring of seismic data. The plurality of borehole sensor arrays of the present invention that are attached along the wire line enables the system to record simultaneous multi-level acquisition seismic data. One embodiment of the present invention utilizes a plurality of these seismic sensor arrays each housed in a plurality of shuttles having acoustic isolation and magnetic clamping capabilities. One embodiment of the present invention utilizes fiber optic geophone technology. Fiber optic technology has the ability to multiplex multiple channels at a high data rate, thereby satisfying the demand for acoustic and seismic imaging applications which require a large sensor array with high data transmission capabilities. Use of fiber optic technology in embodiments of the present invention also allows for a greater number of shuttles because of the smaller profile, lighter weight and the fact that no downhole electronics or power from the surface is required.

One embodiment of the present invention is operable to spool downhole a wire line or coiled tubing conveyance having a plurality of shuttle sensor packages spaced along the cable. Shuttles can be optionally embedded in the conveyance as shown in FIGS. 7 through 9. The sensors can optionally all be attached in a conveyance sensor section as shown in FIG. 10. Below the sensor section the larger components can be positioned such as main electronic units, battery units, and weights. Placing the larger components below the smaller diameter sensor section facilitates fishing as shown in FIG. 10 of the sensor section. As discussed above a weak point in the conveyance can be positioned between the sensor section and the larger components such that if the larger components get stuck during retraction of the tool, the spooling mechanism can apply sufficient tension to the conveyance such that the conveyance is cut at the weak point leaving the larger component downhole to be fished later.

One skilled in the art will appreciate that a method like the present invention is also attractive in the area of borehole logging because you can use the borehole sensing apparatus and method of the present invention in conjunction with a downhole source, such as a acoustic source provided in a sonic tool, to detect response signals at distances further from your source than would be achievable or practical with the receivers contained within the tool that houses your source. It can be appreciated that using a sonic tool with a receiver array such as in the present invention to expand the capability of the acoustic data acquisition system without the difficulties and costs involved in expanding the sonic tool itself.

There has been described and illustrated herein various embodiments of a device and apparatus in accordance with the present invention for downhole seismic data recording. While particular embodiments of the invention have been described, it is not intended that the invention be limited thereby. Therefore, it will be apparent to those skilled in the art that various changes and modifications may be made to the invention as described without departing from the spirit and scope of the appended claims.

What is claimed is:

1. A borehole seismic sensing apparatus comprising:
   a conveyance system tool having a sensor section and having a weak point in the conveyance below said sensor section, the tool being configured to break away below said sensor section at the weak point in the conveyance during retraction if said tool is stuck below the weak point;
   a shuttle attached to said conveyance along said sensor section for placing in a borehole to sense seismic signals said shuffle having a seismic sensor package therein, said sensor package having a magnet clamp operable to selectively magnetically clamp the shuttle to an adjacent structure for acoustically coupling the shuffle and the adjacent structure together; and
   said sensor package in said shuttle being suspended by an acoustic isolator system disposed between said shuttle and said sensor package and operable to isolate said sensor package from propagations through the shuffle and conveyance,
   wherein said acoustic isolator comprises a fine wire suspension and a suspension spring.

2. The borehole seismic sensing apparatus as recited in claim 1 further comprising:
   a tension-sensing device operable to sense tension in the conveyance at the weak point.

3. The borehole seismic sensing apparatus as recited in claim 1 where said conveyance is operable to spool the shuffle downhole into a borehole for sensing subsurface seismic signals and said conveyance includes communication lines communicably linked to the sensor package for communication of seismic data to the surface.

4. The borehole seismic sensing apparatus as recited in claim 1 where said magnet clamp is further operable to magnetically clamp the sensor package to the shuttle for acoustically coupling the sensor package, the shuttle and the adjacent structure together.

5. The borehole seismic sensing apparatus as recited in claim 1 where said conveyance is a tubing conveyance and a shuttle is attached to the exterior of said tubing conveyance along said sensor section by a bow spring adapted to selectively extend said shuttle away from said tubing conveyance and retract against said tubing conveyance.

6. The bore hole seismic sensing apparatus as recited in claim 1 further comprising a shuttle embedded in the conveyance along said sensor section and said shuttle further comprises an exterior cradle portion attached to a main sensor shuttle by a bow spring such that collapsing of the bow spring retracts the main sensor shuttle in the cradle and releasing the tension of the bow spring extends the shuttle outward away from the conveyance and cradle.

7. The borehole seismic sensing apparatus as recited in claim 1 further comprising a shuttle attached to said conveyance along said sensor section, and said shuttle further comprises an exterior cradle portion attached to a main sensor shuttle by a bow spring such that collapsing of the bow spring retracts the main sensor shuttle in the cradle and releasing the tension of the bow spring extends the main sensor shuttle outward away from the conveyance and cradle.

8. The borehole seismic sensing apparatus as recited in claim 1 where said sensor package further comprises a seismic sensor array consisting of seismic sensors selected from hydrophone, geophone, thee-axis seismic sensor, fiber optic seismic sensor or geophone accelerometer.

9. The borehole seismic sensing apparatus as recited in claim 1 where the seismic sensor package is a fiber optic geophone array.

10. The borehole seismic sensing apparatus as recited in claim 9 where said fiber optic geophone array is a three-axis seismic sensor array, and further comprises a transducer acoustically coupled thereto and said transducer is operable to excite said geophones as shakers responsive to a modulated photo current for downhole calibration.

11. The borehole seismic sensing apparatus as recited in claim 1 wherein said shuffle attached to said conveyance is operably attached to a spooling mechanism, said spooling mechanism being operable to selectively lower said conveyance and shuttle attached thereto downhole into a borehole and further operable to selectively retract said conveyance.

12. The borehole seismic sensing apparatus as recited in claim 11 where said conveyance further comprises:
   a pressure/temperature sensor attached thereto and communicably linked to a pressure/temperature monitoring system by said conveyance;
   a distributed temperature sensor attached thereto and communicably linked to a distributed temperature sensor system by said conveyance; and
   a downhole battery attached thereto for providing a downhole power source.

13. A borehole seismic sensing apparatus comprising:
   a conveyance system tool having a sensor section and having a weak point in the conveyance below said sensor section, the tool being configured to break away below said sensor section at the weak point in the conveyance during retraction if said tool is stuck below the weak point;
   a shuffle attached to said conveyance along said sensor section for placing in a borehole to sense seismic signals, said shuffle having a seismic sensor package therein, said sensor package having a magnet clamp operable to selectively magnetically clamp the shuffle to an adjacent structure for acoustically coupling the shuffle and the adjacent structure together, said magnet clamp comprising a permanent magnet reciprocably mounted in said sensor package; and
   an actuator operable to reciprocably reorient said permanent magnet where said reciprocable reorientation reciprocably clamps and unclamps the shuffle, wherein said actuator is a hydraulic actuator and said magnet is a cylindrical shaped magnet polarized in a radial direction and rotatably mounted between pole pieces, said hydraulic actuator being operable to reciprocably rotate the cylindrical magnet about its cylindrical axis for selectively magnetically clamping said shuffle against the adjacent structure and for selectively unclamping.

14. The borehole seismic sensing apparatus as recited in claim 13 where said conveyance comprises:
   a sensor array communication line communicably linked between said sensor package and a geophone sensor system for carrying seismic data sensed by the sensor package and transmitted uphole to the geophone sensor system; and
   an actuator control line communicably linked between said actuator and an actuator control system operable to control the actuator for controlling clamping and unclamping.

* * * * *